(12) United States Patent
Sugiyama

(10) Patent No.: US 9,037,687 B2
(45) Date of Patent: May 19, 2015

(54) INFORMATION PROCESSING APPARATUS, METHOD AND PROGRAM FOR WRITING FILE SYSTEM METADATA OF PLURAL OPERATING SYSTEMS

(75) Inventor: Hirokazu Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 12/752,385

(22) Filed: Apr. 1, 2010

(65) Prior Publication Data

US 2010/0262672 A1    Oct. 14, 2010

(30) Foreign Application Priority Data

Apr. 14, 2009  (JP) ................ P2009-097581
Feb. 10, 2010  (JP) ................ 2010-027460

(51) Int. Cl.
| | |
|---|---|
| *G06F 15/177* | (2006.01) |
| *G07F 7/10* | (2006.01) |
| *G06Q 20/32* | (2012.01) |
| *G06Q 20/34* | (2012.01) |

(52) U.S. Cl.
CPC .......... *G07F 7/1008* (2013.01); *G06Q 20/3278* (2013.01); *G06Q 20/354* (2013.01); *G06Q 20/3552* (2013.01); *G06Q 20/3558* (2013.01)

(58) Field of Classification Search
CPC ...................................... G06F 15/16
USPC ................... 709/208, 220; 719/319
See application file for complete search history.

(56) References Cited

U.S. PATENT DOCUMENTS

| | | | | |
|---|---|---|---|---|
| 4,530,052 A | * | 7/1985 | King et al. ............ | 713/100 |
| 5,365,045 A | * | 11/1994 | Iijima ................ | 235/380 |
| 6,994,263 B2 | * | 2/2006 | Ueda et al. ............ | 235/492 |
| 8,230,233 B2 | * | 7/2012 | Yoneda ................ | 713/189 |
| 8,271,996 B1 | * | 9/2012 | Gould et al. .......... | 719/312 |
| 2002/0104017 A1 | | 8/2002 | Stefan | |
| 2003/0110344 A1 | * | 6/2003 | Szczepanek et al. ....... | 711/100 |
| 2004/0232248 A1 | | 11/2004 | Cho | |
| 2005/0144436 A1 | * | 6/2005 | Chen et al. ............ | 713/100 |
| 2005/0235278 A1 | | 10/2005 | Wu et al. | |
| 2006/0270397 A1 | | 11/2006 | Iwahashi et al. | |

(Continued)

FOREIGN PATENT DOCUMENTS

| | | |
|---|---|---|
| EP | 1686468 | 8/2006 |
| EP | 1786229 | 5/2007 |
| EP | 1873689 | 1/2008 |
| EP | 2034403 | 3/2009 |
| JP | 2007-087120 | 4/2007 |
| JP | 2007-87120 | 5/2007 |

OTHER PUBLICATIONS

European Search Report for Application No. 10002643.4-2221/ 2242030 dated Jul. 18, 2011.
Sun Microsystems: Java Card Technology Overview, internet citation, May 7, 2006, XP002433357, Retrieved from internet URL:http://web.archive.org/web/20060507004046/http://java.sun.com/developer/Books/consumerproducts/javacard/cho3.pdf (retrieved May 11, 2007), the whole document.

*Primary Examiner* — David Lazaro
*Assistant Examiner* — Marie Georges Henry
(74) *Attorney, Agent, or Firm* — K&L Gates LLP

(57) ABSTRACT

An information processing apparatus includes a transmission unit transmitting a command of a second operating system to the second operating system when receiving the command via a communication path which communicates under a control based on a first operating system, an extraction unit extracting data for the second operating system by analyzing the command transmitted from the transmission unit, and a writing unit writing the data extracted by the extraction unit as data constituting file system metadata of the second operating system.

17 Claims, 16 Drawing Sheets

| 171 | 172 | 173 | 174 | 175 | 176 | 177 |
|---|---|---|---|---|---|---|
| CLA | INS | P1 | P2 | LC | DATA = AID | LE |

161

(56) References Cited

U.S. PATENT DOCUMENTS

| | | | |
|---|---|---|---|
| 2007/0124796 A1* | 5/2007 | Wittkotter | 725/136 |
| 2007/0180454 A1 | 8/2007 | Fujimoto et al. | |
| 2008/0127088 A1* | 5/2008 | Harmsen et al. | 717/121 |
| 2008/0151767 A1* | 6/2008 | Moran et al. | 370/252 |
| 2008/0306872 A1* | 12/2008 | Felsher | 705/51 |
| 2010/0017613 A1* | 1/2010 | Chen et al. | 713/172 |
| 2010/0124227 A1* | 5/2010 | Williams et al. | 370/392 |
| 2010/0165215 A1* | 7/2010 | Shim | 348/734 |

\* cited by examiner

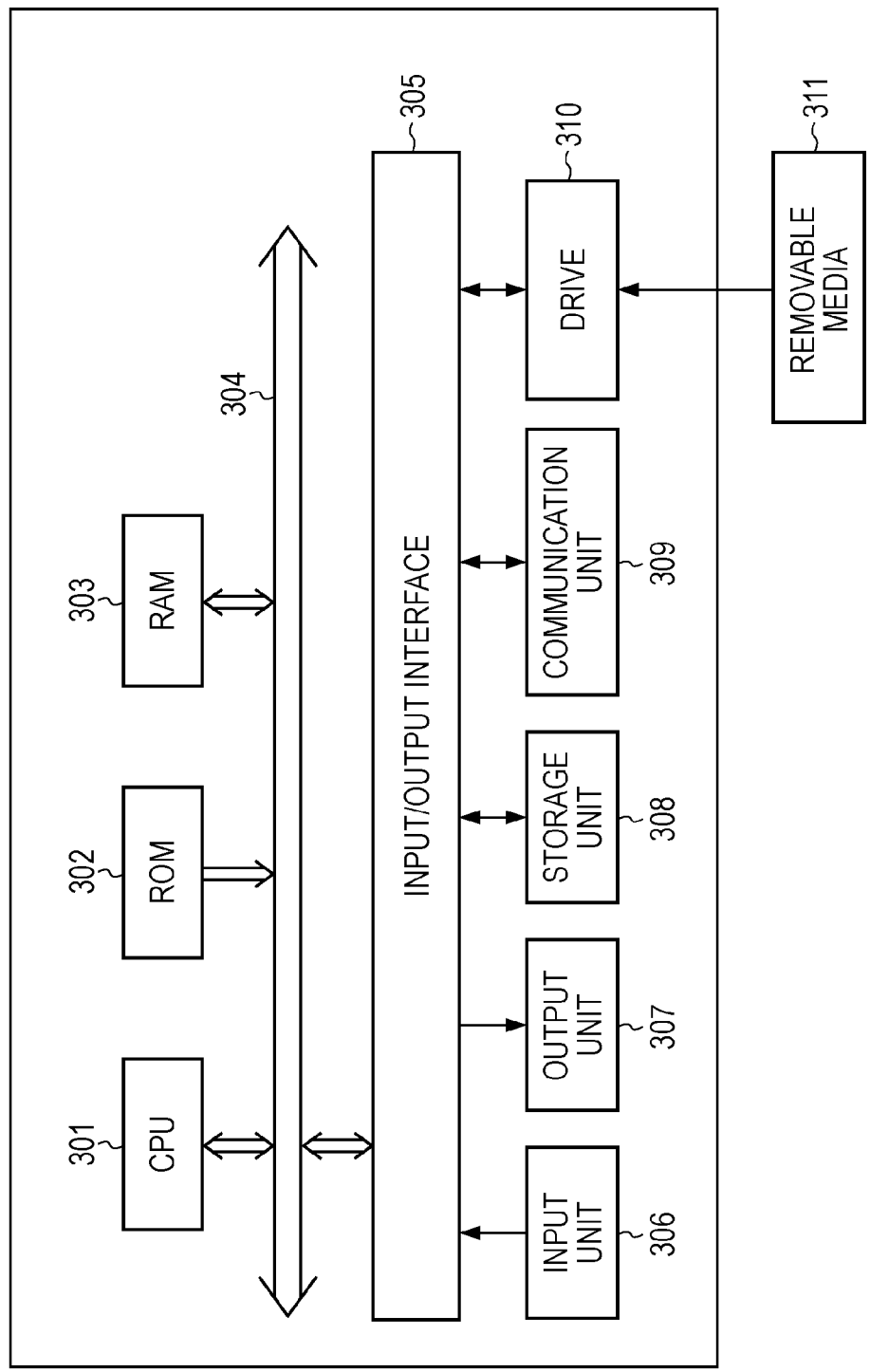

INFORMATION PROCESSING APPARATUS, METHOD AND PROGRAM FOR WRITING FILE SYSTEM METADATA OF PLURAL OPERATING SYSTEMS

CROSS REFERENCES TO RELATED APPLICATIONS

The present application claims priority to Japanese Priority Patent Application JP 2009-097581 filed in the Japan Patent Office on Apr. 14, 2009, and Japanese Priority Patent Application JP 2010-027460 filed in the Japan Patent Office on Feb. 10, 2010, the entire contents of which are hereby incorporated by reference.

BACKGROUND

The present application relates to an information processing apparatus, method and program, and, more particularly, to an information processing apparatus, method and program suitable for use in writing file system metadata of plural operating systems.

In recent years, a card has been disseminated which has a non-contact module capable of communicating in a non-contact manner by including an IC (integrating circuit). Such a card is called, for example, a "non-contact IC card" or the like, and is capable of communicating with other devices in a non-contact manner. The non-contact IC card is used for non-contact communication which has been adopted in, for example, transportation tickets, electronic money, ID cards, entrance-exit systems, and the like, and use of the non-contact IC card is widespread.

Corresponding to these various uses, such a non-contact IC card is configured to have an OS (operating system) suitable for each use (Japanese Unexamined Patent Application Publication No. 2007-87120 is an example of the related art).

SUMMARY

Typically, file system metadata of an operating system in the non-contact IC card is written using an interface specially prepared by a chip vendor in a factory manufacturing IC cards at the time of its manufacture. The interface, prepared by the chip vendor, for writing metadata is generally not kept secure. However, the file system metadata includes security information such as a key value and the like in a section of it. Therefore, an environment for writing file system metadata is preferably a place which can maintain security.

However, there are many chip vendors who do not have their own manufacturing equipment but entrust the manufacturing to other companies (a fabless manufacturer). As for this fabless manufacturer, it is not easy in terms of cost and the like to find a place which can maintain security.

It is desirable to write the file system metadata of an operating system in an IC card using the IC card.

An information processing apparatus according to an embodiment includes, a transmission means for transmitting a command for a second operating system to the second operating system when receiving the command via a communication path which communicates under a control based on a first operating system, an extraction means for extracting data for the second operating system by analyzing the command transmitted from the transmission means, and a writing means for writing the data extracted by the extraction means as data constituting file system metadata of the second operating system.

The information processing apparatus may further include the first operating system and the second operating system.

The information processing apparatus may constitute an IC chip, an IC card, or a mobile phone.

The transmission means may be provided in an HAL (Hardware Abstract Layer).

An information processing method according to an embodiment, in an information processing apparatus having a transmission means, an extraction means and a writing means, includes the steps of transmitting a command for a second operating system to the second operating system when receiving the command via a communication path which communicates under a control based on a first operating system, by the transmission means, extracting data for the second operating system by analyzing the transmitted command, by the extraction means, and writing the extracted data as data constituting file system metadata of the second operating system, by the writing means.

A program enables a computer to execute a processing according to an embodiment, in an information processing apparatus having a transmission means, an extraction means and a writing means, the processing including the steps of transmitting a command of a second operating system to the second operating system when receiving the command via a communication path which communicates under a control based on a first operating system, by the transmission means, extracting data for the second operating system by analyzing the transmitted command, by the extraction means, and writing the extracted data as data constituting file system metadata of the second operating system, by the writing means.

In an information processing apparatus, method and program according to an embodiment, a command for a second operating system is transmitted to the second operating system for analysis, when the command is received via a communication path which communicates under a control based on a first operating system, data for the second operating system is extracted, and the extracted data is written as data constituting file system metadata of the second operating system.

An information processing apparatus according to another embodiment includes a supply means for supplying a command for a second operating system to a transmission means when receiving the command via a communication path which communicates under a control based on a first operating system, a transmission means for transmitting the command supplied from the supply means to the second operating system, an extraction means for extracting data for the second operating system by analyzing the command transmitted from the transmission means, and a writing means for writing the data extracted by the extraction means as data constituting file system metadata of the second operating system.

The information processing apparatus may constitute an IC chip, an IC card, or a mobile phone.

The supply means may be provided in the first operating system.

The transmission means may be provided in an HAL (Hardware Abstract Layer).

An information processing method according to another embodiment, in an information processing apparatus having a supply means, a transmission means, an extraction means and a writing means, includes the steps of supplying a command for a second operating system to a transmission means when receiving the command via a communication path which communicates under a control based on a first operating system, by the supply means, transmitting the supplied command to the second operating system, by the transmission means, extracting data for the second operating system by analyzing the transmitted command by the extraction means, and writing the extracted data as data constituting file system metadata of the second operating system, by the writing means.

A program enables a computer to execute a processing according to another embodiment, in an information processing method of an information processing apparatus having a supply means, a transmission means, an extraction means and a writing means, the processing including the steps of supplying a command for a second operating system to a transmission means when receiving the command via a communication path which communicates under a control based on a first operating system, by the supply means, transmitting the supplied command to the second operating system, by the transmission means, extracting data for the second operating system by analyzing the transmitted command by the extraction means, and writing the extracted data as data constituting file system metadata of the second operating system, by the writing means.

In an information processing apparatus, method and program according to another embodiment, a command for a second operating system is transmitted to the second operating system for analysis, when the command is received via a communication path which communicates under a control based on a first operating system, data for the second operating system is extracted, and the extracted data is written as data constituting file system metadata of the second operating system.

According to an embodiment, it is possible to write predetermined data regarding an operating system of an IC card in the IC card. Also, the writing can be performed while maintaining security.

Additional features and advantages are described herein, and will be apparent from the following Detailed Description and the figures.

BRIEF DESCRIPTION OF THE FIGURES

FIG. 17 is a diagram illustrating a recording medium.

DETAILED DESCRIPTION

The present application will be described with reference to the attached drawings according to an embodiment.

[Configuration of System]

Figure 1:
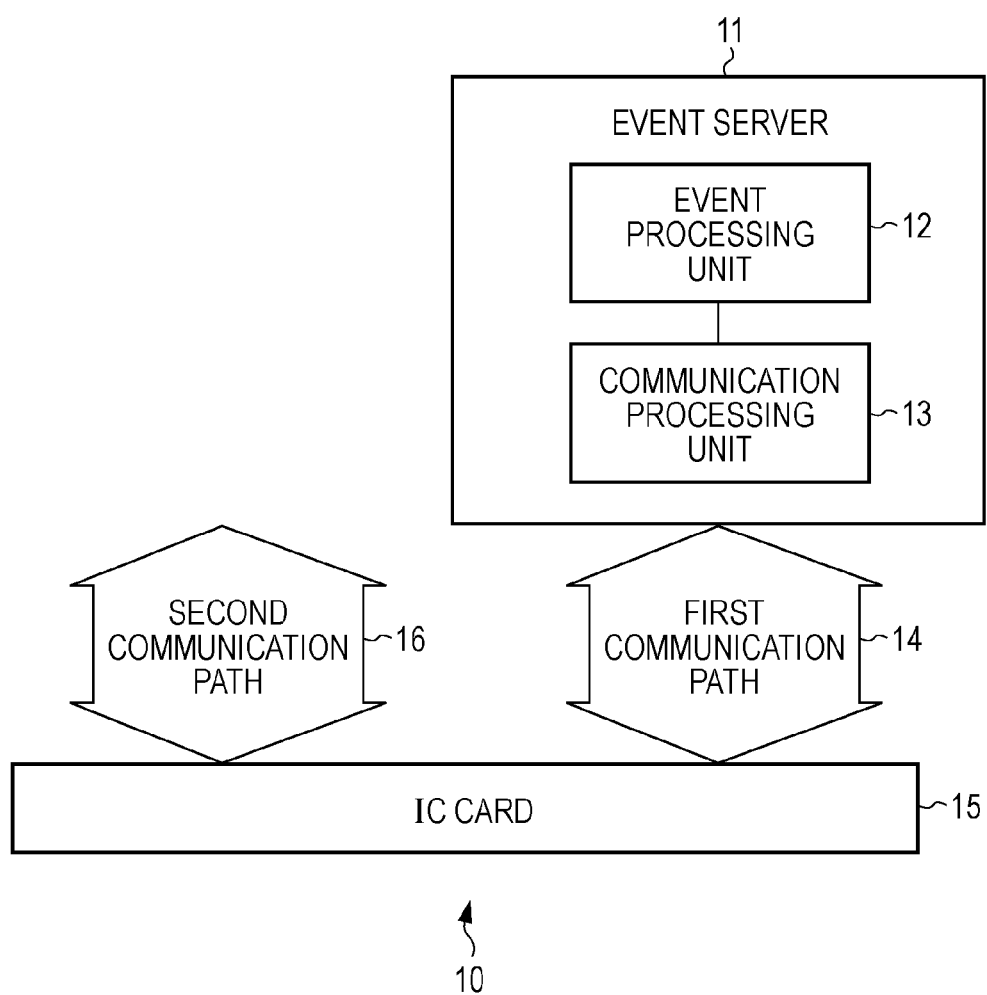
FIG. 1 is a diagram of an information processing system according to an embodiment.

FIG. 1 is a diagram illustrating a configuration of an information processing system according to an embodiment. An information processing system 10 shown in FIG. 1 has an event server 11, an event processing unit 12, a communication processing unit 13, a first communication path 14, an IC card 15, and a second communication path 16. The event server 11 includes the event processing unit 12 and the communication processing unit 13.

The event server 11 communicates with the IC card 15 via the first communication path 14. The IC card 15 communicates with a server (not shown) or the like via the second communication path 16. The first and second communication paths are communication paths used when communications are performed under controls based on different operating systems, respectively. For example, when the IC card 15 performs communication under a control based on a first operating system, the communication is carried out using the first communication path 14. In addition, for example, when the IC card 15 performs communication under a control based on a second operating system, the communication is carried out using the second communication path 16.

The first operating system and the second operating system are different from each other. As described later, the IC card 15 may include both the first operating system and the second operating system, or may include the second operating system. However, the present application is not limited to the configuration including one or two operating systems. In other words, the present application is applicable to an IC card including a plurality of operating systems.

The first operating system is, for example, a Java Card OS, or the like. The Java Card OS as a card application can mount additional functions onto itself. In addition, herein, the first operating system is described as, for example, the Java Card OS, throughout the specification; however, it may be, for example, a MULTOS OS or a Native OS of a reader as well as the Java Card OS.

The second operating system is, for example, a FeliCa OS or the like. The FeliCa (trademark) OS is used for a card which is employed as electronic money, and the card replaces a credit card or a prepaid card and is used in business transactions. The FeliCa OS can write a numerical value indicating electronic money in a predefined region afterwards and define a range of a region used as electronic money afterwards.

The event processing unit 12 of the event server 11 generates a command for the second operating system. The generated command is supplied to the communication processing unit 13. The communication processing unit 13 converts the supplied command into a command which can be treated by the first operating system (a command which can be analyzed by the first operating system). The command supplied from the event processing unit 12 is transmitted to the IC card 15 via the first communication path 14 which communicates under the control based on the first operating system. The communication processing unit 13 receives data (for example, a later-described command reply) from the IC card 15 via the first communication path 14.

Figure 2:
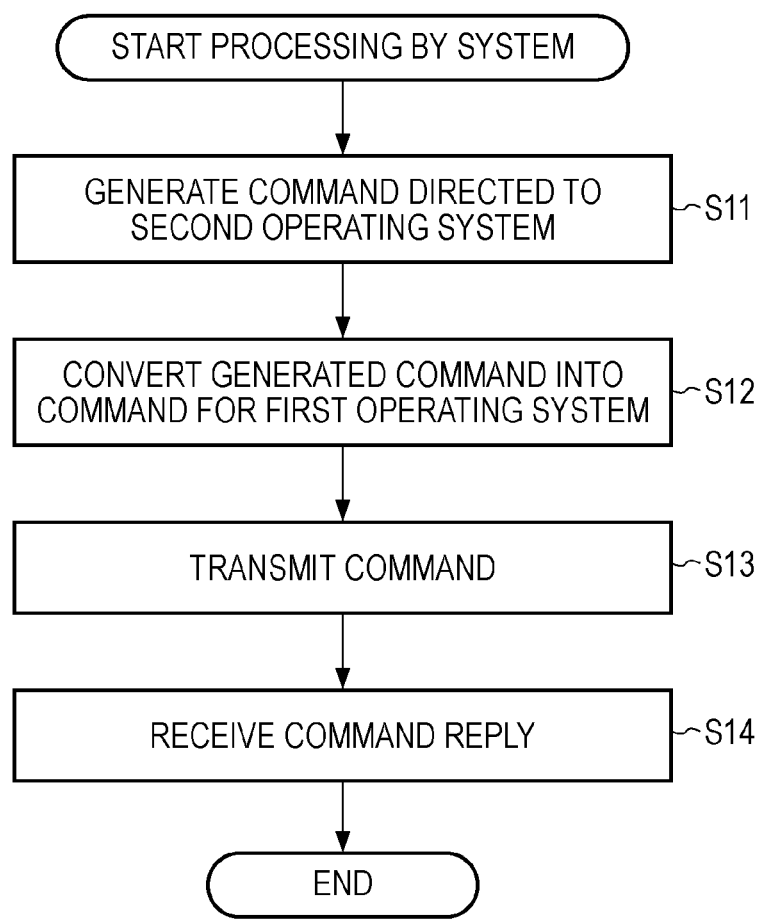
FIG. 2 is a flowchart illustrating an operation of the information processing system.

A processing carried out by this system, principally, the event server 11 will be described with reference to a flowchart in FIG. 2. In addition, a configuration or an operation of the IC card 15 is described in detail. To begin with, an operation of the system is further described.

At step S11, the event processing unit 12 of the event server 11 generates a command directed to the second operating system. The generated command described later is a command and so on, for example, including data used by the second operating system for the event processing. The generated command is supplied to the communication processing unit 13.

At step S12, the communication processing unit 13 converts the supplied command into a command of the first operating system. At step S13, the communication processing unit 13 transmits the converted command to the IC card 15 via the first communication path 14. As above, the event server 11 converts the command of the second operating system into the command which can be treated by the first operating system, and transmits it to the IC card 15 via the first communication path 14 which communicates under the control based on the first operating system.

The IC card 15 processes the received command by carrying out a processing described later and transmits a command reply including the processing result. The transmission is also performed using the first communication path 14. At step S14, the communication processing unit 13 of the event server 11 receives the command reply from the IC card 15. The communication processing unit 13 extracts predetermined data from the received command reply, and supplies the extracted data to the event processing unit 12 as results processed by the IC card 15 alongside the processing at Steps S11 to S13. If an error occurs in the data, a processing such as retransmission of data and the like is executed.

[Another Configuration of the Information Processing System]

Figure 3:
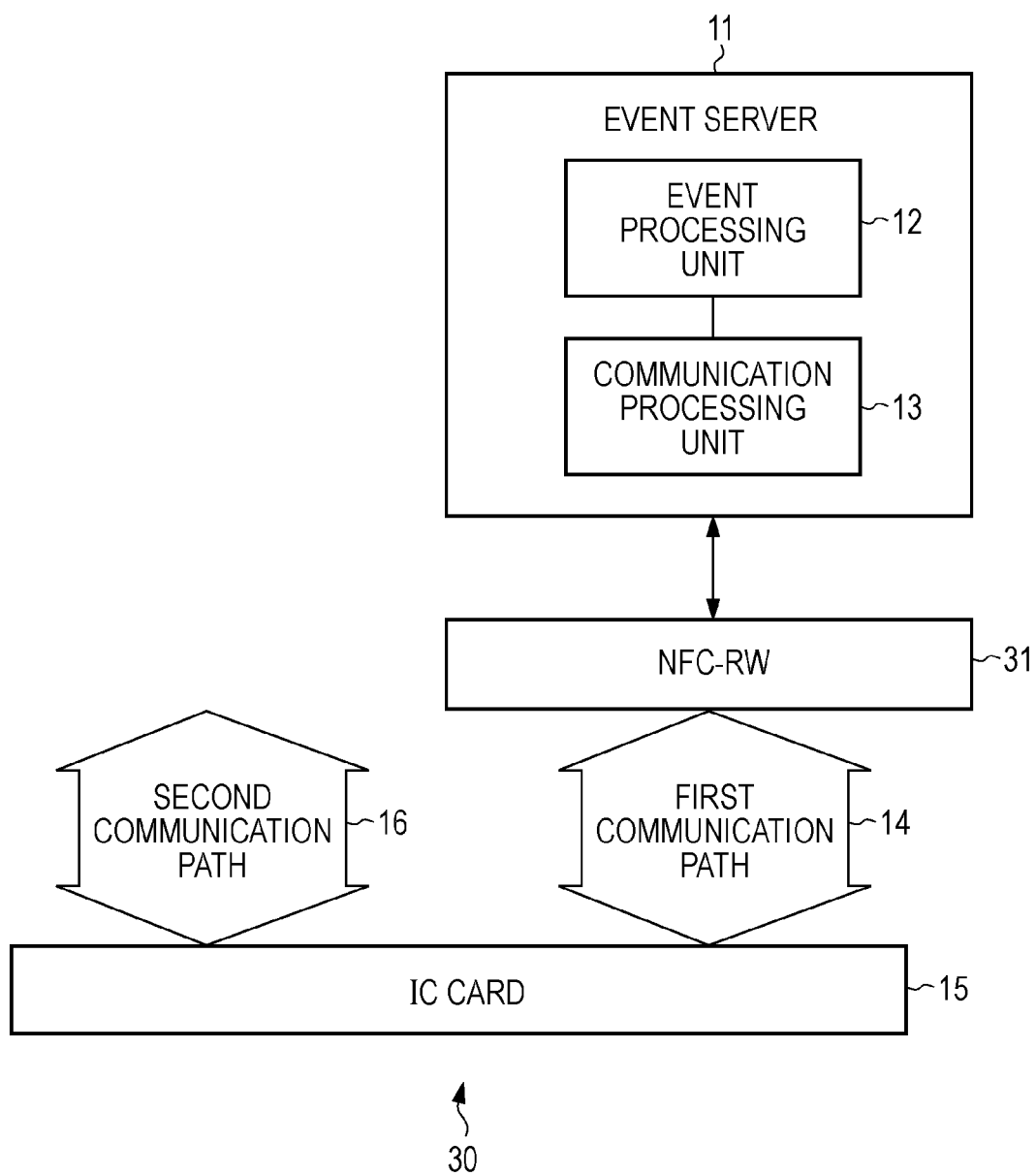
FIG. 3 is a diagram illustrating a configuration of another information processing system according to an embodiment.

FIG. 3 is a diagram illustrating a configuration according to another embodiment. An information processing system 30 shown in FIG. 3 has an event server 11, an event processing unit 12, a communication processing unit 13, a first communication path 14, an IC card 15, a second communication path 16, and an NFC-RW 31. The elements with the same functions as those of the information processing system 10 shown in FIG. 1 are given the same reference numerals, and the description thereof will be appropriately omitted.

The information processing system 30 shown in FIG. 3 has a configuration in which the NFC-RW 31 is added to the information processing system 10 shown in FIG. 1. The NFC-RW 31 is provided between the event server 11 and the first communication path 14. NFC stands for near field communication and RW stands for reader/writer. NFC is a communication protocol which can handle a plurality of communication formats in non-contact near wireless communication. According to the non-contact near wireless communication using this NFC, for example, a reader and a writer can perform a non-contact near wireless communication with a plurality of non-contact IC cards 15 corresponding to communication formats different from each other.

Figure 4:
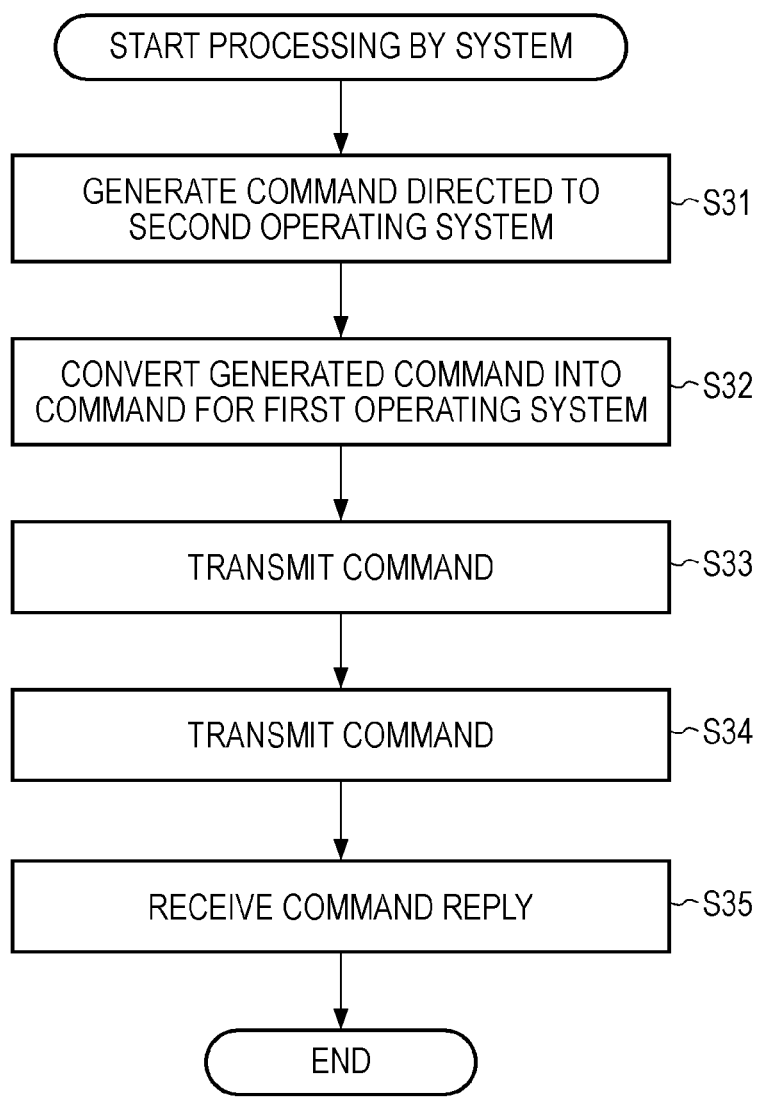
FIG. 4 is a flowchart illustrating another operation of the information processing system.

An operation of the information processing system 30 is descried with reference to a flowchart in FIG. 4. The processings at steps S31 and S32 are the same as those at steps S11 and S12 in the flowchart shown in FIG. 2, wherein the command for the second operating system is generated and is converted into the command which can be treated by the first operating system. At step S33, the communication processing unit 13 transmits the command generated by the event processing unit 12 to the NFC-RW 31. The communication processing unit 13 and the NFC-RW 31 are connected to each other in a wired or a wireless manner. Also, the communication processing unit 13 and the NFC-RW 31 may be connected to each other via a predetermined network.

At step S34, the NFC-RW 31 transmits the supplied command to the IC card 15 via the first communication path 14. This communication is performed in a non-contact manner. At step S35, the communication processing unit 13 receives a command reply from the IC card 15 via the first communication path 14 and the NFC-RW 31.

As above, the event server 11 converts the data of the second operating system into data of a format which can be treated by the first operating system, and transmits the command to the IC card 15 via the first communication path 14 which communicates under the control based on the first operating system. Next, the IC card 15 receiving this command will be described.

[Configuration and Operation of the IC Card]

Figure 5:
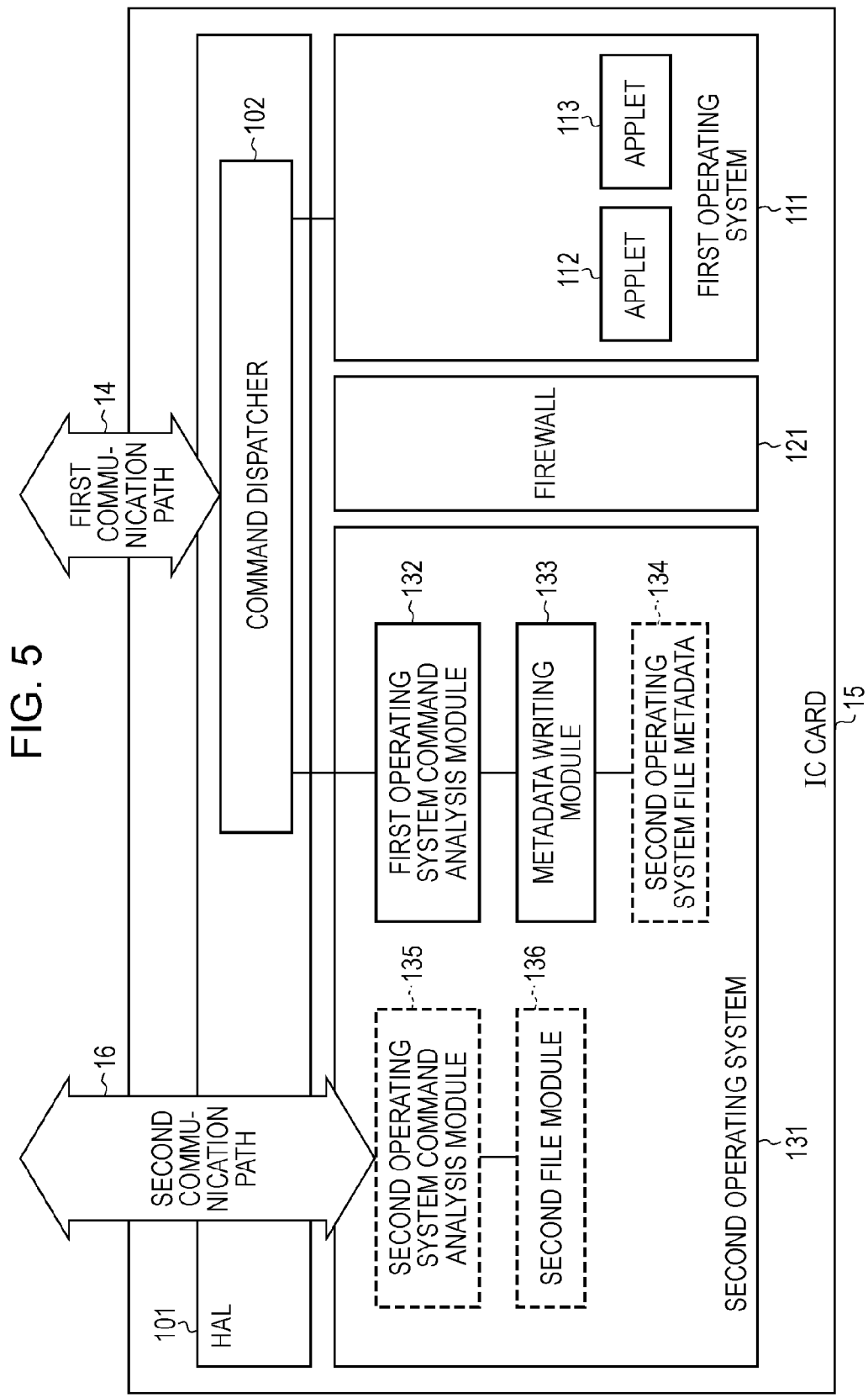
FIG. 5 is a diagram illustrating a configuration of an IC card.

FIG. 5 is a diagram illustrating a configuration of the IC card 15. The IC card 15 shown in FIG. 5 has an HAL (Hardware Abstraction Layer) 101, a command dispatcher 102, a first operating system 111, an applet 112, an applet 113, a firewall 121, a second operating system 131, a first operating system command analysis module 132, a metadata writing module 133, a second operating system file metadata 134, a second operating system command analysis module 135, and a second file module 136.

The HAL 101 is configured to have the command dispatcher 102. This command dispatcher 102 supplies (transmits) a command transmitted via the first communication path 14 to the first operating system 111 or the second operating system 131, by referring to predetermined data contained in the command. Especially, the command dispatcher 102 receives a command for the second operating system 131 via the first communication path 14 which communicates under the control based on the first operating system 111, and transmits the received command to the second operating system 131.

The HAL 101 has a function of concealing the difference between different pieces of hardware. For example, even when using different pieces of hardware, an operating system can have access to each of the different pieces of hardware via the same interface. The use of the HAL 101 with such a function enables the hardware and the HAL to be changed without changing the mounting of the operating system, and therefore the operating system can use the same function.

In this embodiment, the use of the HAL 101 allows the command dispatcher 102 to be used even when an algorithm is changed in transmitting and receiving data, for example, via the first communication path 14, and thus the data can be transmitted and received using the same algorithm although the command dispatcher 102 is any type of interface. That is to say, an event algorithm described below can be applied by adopting the HAL 101, regardless of the type of command dispatcher 102.

The first operating system 111 includes the applet 112 and the applet 113. As described above, the first operating system 111 is, for example, the Java Card OS, and the applet 112 and the applet 113 are programs run by the Java Card OS. The first operating system 111 and the second operating system 131 are configured to have no access to each other. In order to have no access to each other, the firewall 121 is provided between the first operating system 111 and the second operating system 131.

The second operating system 131 includes the first operating system command analysis module 132, the metadata writing module 133, the second operating system file metadata 134, the second operating system command analysis module 135, and the second file module 136.

The first operating system command analysis module 132 analyzes a command supplied from the command dispatcher 102 and extracts predetermined data for the second operating system 131 therefrom. The command supplied to the first operating system command analysis module 132 is converted into a format which can be treated by the first operating system 111, although it is a command for the second operating system 131. In addition, the command supplied to the first operating system command analysis module 132 is a command undertaking communication in a state where security is maintained, by using a function concerning encrypted communication of the first operating system 111.

Therefore, the first operating system command analysis module 132 is included in the second operating system 131; however, it has a function of analyzing the command for the first operating system 111, or of decrypting the command to which the encryption function of the first operating system 111 has been applied.

The data from the first operating system command analysis module 132 is supplied to the metadata writing module 133. The metadata writing module 133 writes the data from the first operating system command analysis module 132 in the second operating system file metadata 134. In other words, as a result analyzed by the first operating system command analysis module 132, the extracted data is data constituting the second operating system file metadata 134. The metadata writing module 133 writes such data.

The frame of the second operating system file metadata 134 shown in FIG. 5 is marked with dotted lines. This indicates that the second operating system file metadata 134 works only after the metadata is written in the second operating system file metadata 134 by the metadata writing module 133. In addition, the second operating system command analysis module 135 and the second file module 136 also work only after the metadata is written in the second operating system file metadata 134, and thus the frame thereof is marked with dotted lines as well in FIG. 5.

The second operating system command analysis module 135 obtains and analyzes a command for the second operating system 131 supplied via the second communication path 16. The analysis result is supplied to the second file module 136. The second file module 136 carries out a processing based on the analysis result from the second operating system command analysis module 135.

Figure 6:
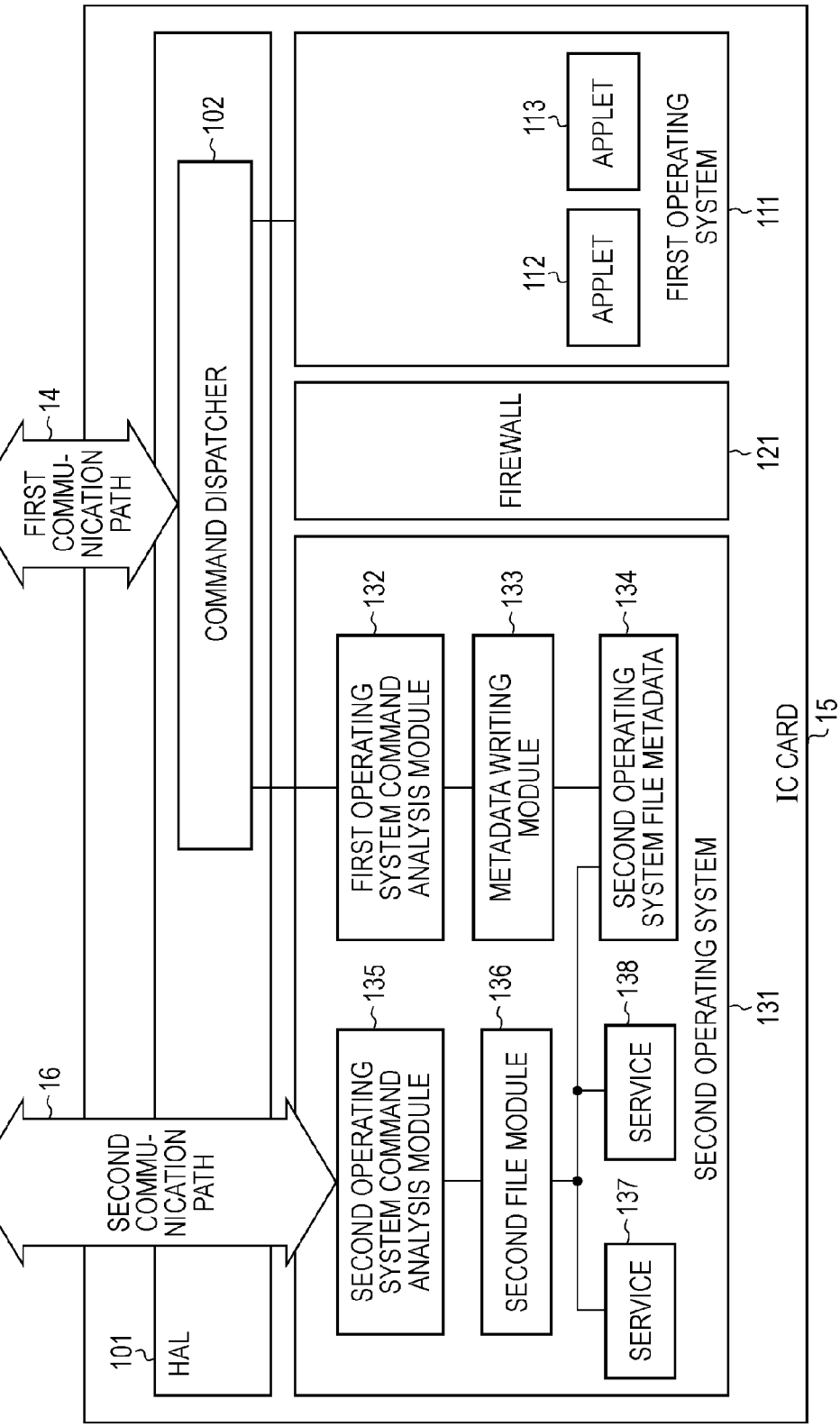
FIG. 6 is a diagram illustrating a configuration of an IC card.

For example, it is possible to include additional services in the second operating system 131, as shown in FIG. 6. The service 137 or the service 138 is added after the metadata is written in the second operating system file metadata 134, and thereby the second operating system file metadata 134, the second operating system command analysis module 135 and the second file module 136 work, respectively.

If the second operating system 131 is assumed as the FeliCa (trademark) OS, which is used as a card for use as electronic money, the card replaces a credit card or a prepaid card and is used in business transactions. The service 137 or the service 138 is for offering a credit card service or a prepaid card service. The second file module 136 controls the service 137 or the service 138 on the basis of the data from the second operating system command analysis module 135.

The first operating system command analysis module 132, the metadata writing module 133, the second operating system command analysis module 135, and the second file module 136 are stored in, for example, a read only memory such as a ROM (Read Only Memory) or the like. The second operating system file metadata 134, the service 137 and the service 138 are stored in a non-volatile memory, for example, an EEPROM (Erasable Programmable ROM) or the like.

A processing for writing the second operating system file metadata 134 will be described below. The processing for writing the second operating system file metadata 134 is carried out by the second operating system 131, and therefore the first operating system 111 may not be included in the IC card 15. That is to say, the IC card 15 may have a configuration as shown in FIG. 7.

Figure 7:
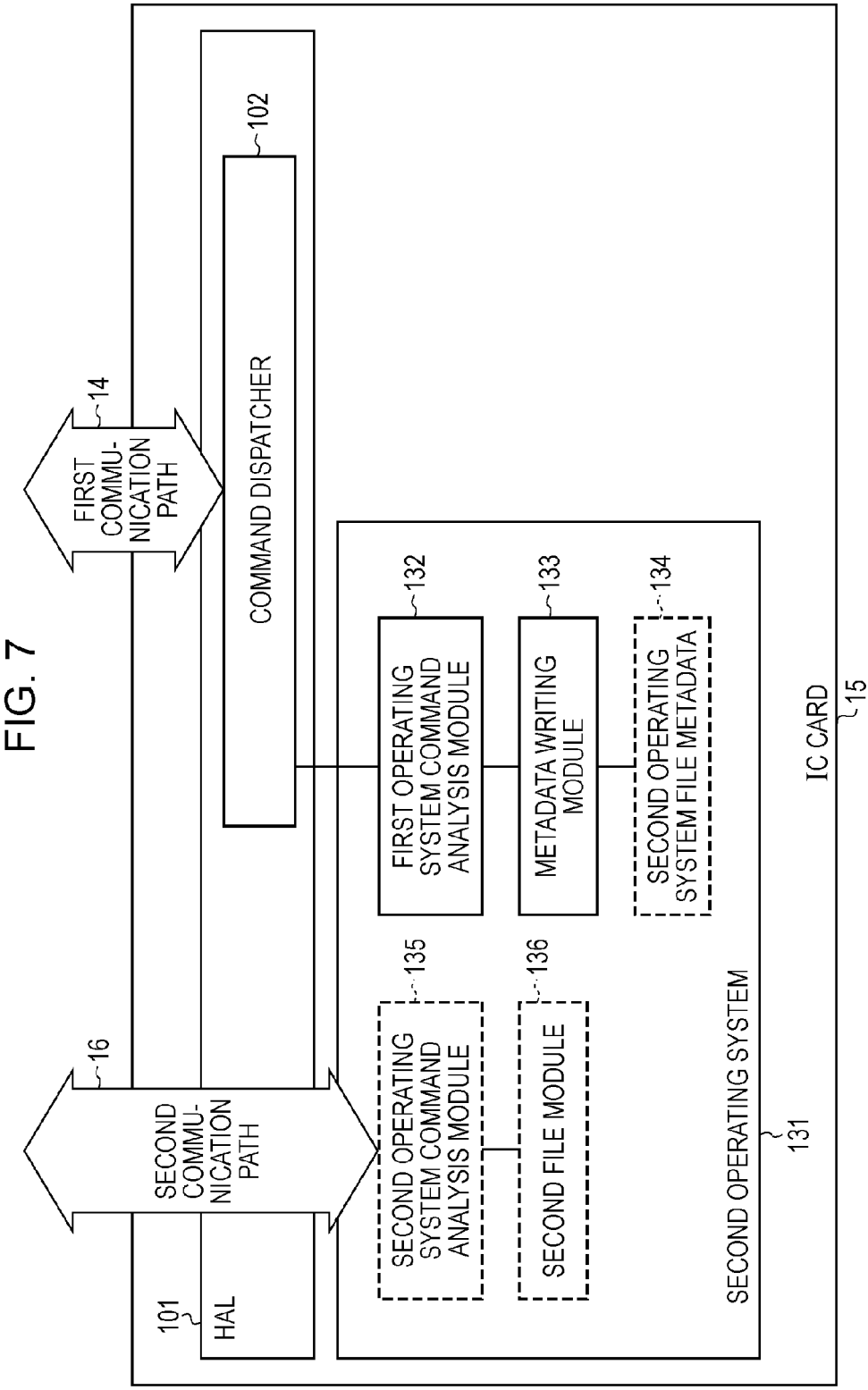
FIG. 7 is a diagram illustrating a configuration of an IC card.

The IC card 15 shown in FIG. 7 has a configuration in which the first operating system 111 and the firewall 121 are removed from the IC card 15 shown in FIG. 5. Even this configuration can perform the processing for writing the second operating system file metadata 134 described below.

Next, the processing performed by the IC card 15 shown in FIG. 5 or FIG. 7 will be described. To begin with, a processing performed by the command dispatcher 102 will be described with reference to a flowchart in FIG. 8.

At step S101, the command dispatcher 102 receives a command via the first communication path 14. At step S102, the command dispatcher 102 determines a transmission destination with reference to data (identifier and so on) recorded in a predetermined region in the received command. At step S103, the command is set to be transmitted to the second operating system 131. This flow of the processings is carried out when the data which has been referred to at step S102 indicates a command directed to the second operating system 131.

Here, the received command, in this flow of the processings, that is, when the command dispatcher 102 sets the received command to be transmitted to the second operating system 131, will be described. The received command in this flow of the processings is a command referred to as a Select command. The Select command is used in selecting files, and so on.

Figure 9:
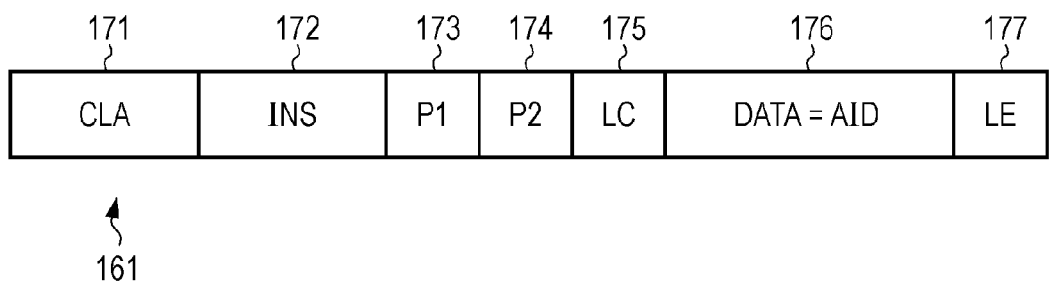
FIG. 9 is a diagram illustrating a command.

A command 161 shown in FIG. 9 has a CLA region 171, an INS region 172, a P1 region 173, a P2 region 174, an LC region 175, a DATA region 176, and an LE region 177. An instruction class is written in the CLA region 171, an instruction code is written in the INS region 172, an instruction parameter 1 is written in the P1 region 173, and an instruction parameter 2 is written in the P2 region 174. The number of bytes of the DATA region 176 in the command 161 is written in the LC region 175, command data is written in the DATA region 176, and the maximum number of bytes expected in a data field of a response to the command is written in the LE region 177.

If the command 161 is the Select command, "A4", which is an identifier indicating that this command is the Select command, is written in the INS region 172. The command dispatcher 102 recognizes the Select command when the "A4" is written in the INS region 172 of the received command 161. Next, the DATA region 176 is referred to. In the DATA region 176, "AID" is written. This "AID" stands for Association Identifier and is information indicating an operating system of a destination. For example, the AID is given as follows. AID="A0 00 00 03 17 01 XX XX XX XX." Here, "XX XX XX XX" indicates what is undefined.

When AID="A0 00 00 03 17 01 XX XX XX XX," the operating system of the destination is assumed as the second operating system 131. The command dispatcher 102 sets a destination to the second operating system 131, at step S102, when the "A4" is written in the INS region 172 of the received command 161 and AID="A0 00 00 03 17 01 XX XX XX XX" is written in the DATA region 176, and sets a command received since this time to be transmitted to the second operating system 131. This setting is maintained until a command reply is obtained from the first operating system command analysis module 132.

Though detailed description is omitted, when codes other than the "A4" are written in the INS region 172 of the command 161 or data other than the AID is written in the DATA region 176 thereof, a processing corresponding to the code or the data is carried out.

The command dispatcher 102 receives the Select command, and thereafter there is a possibility that it receives commands frequently. The command dispatcher 102 receives the Select command and sets commands received since then to be transmitted to the second operating system 131, and thereby the commands received since then are transmitted to the second operating system 131. In a command transmitted like this, data constituting the second operating system file metadata 134 is written in the DATA region 176 (which will be described in detail with reference to FIGS. 12 and 13), although not shown.

Referring to the flowchart in FIG. 8 again, at step S104, the command dispatcher 102 transmits the command 161 received via the first communication path 14 to the second operating system 131. The second operating system 131 receives the command 161 from the command dispatcher 102 by the first operating system command analysis module 132. Thereafter, a processing described later is carried out in the second operating system 131, and a command reply indicating the processing result is output to the command dispatcher 102 from the second operating system 131.

The command dispatcher 102 obtains the command reply at step S105. The obtained command reply has been converted into a format which can be treated by the first operating system 111. The command dispatcher 102, at step S106, transmits the obtained command reply to the event server 11 via the first communication path 14. As for the command received via the first communication path 14 at the time of obtaining the command reply, the setting of transmission to the second operating system 131 is canceled.

As above, the command dispatcher 102 receives the command from the event server 11, and sets the obtained command to be transmitted to the first operating system 111 or the second operating system 131 by referring to the information contained in the command. This setting is performed by the command dispatcher 102, and thereby even when the command of a format which is treated by the first operating system 111 is received via the first communication path 14, the command can be transmitted to the second operating system 131. This enables the following processing to be carried out in the second operating system 131.

A processing carried out by the first operating system command analysis module 132 of the second operating system 131 will be described with reference to a flowchart in FIG. 10.

Figure 8:
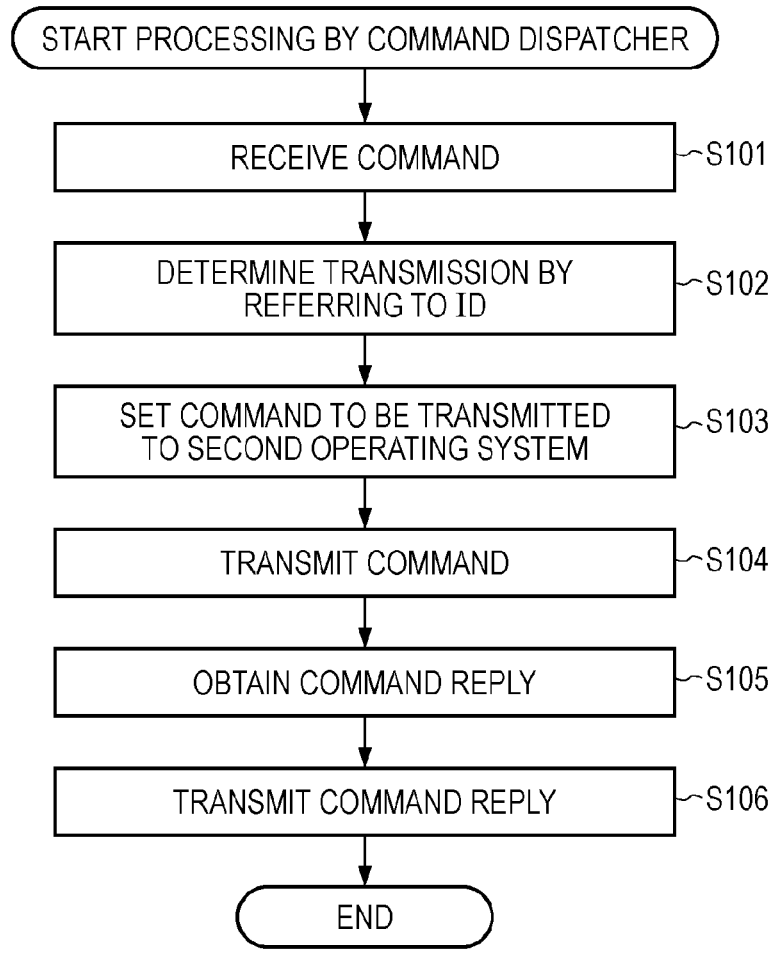
FIG. 8 is a flowchart illustrating a processing by a command dispatcher.

At step S131, the first operating system command analysis module 132 obtains a command from the command dispatcher 102. This processing is performed when the command dispatcher 102 performs the processing at step S104 (FIG. 8). The first operating system command analysis module 132 analyzes the obtained command at step S132. It extracts data from the command 161 by the use of the analysis result at step S133. The extracted data is data to be written as the second operating system file metadata 134 and is described later with reference to FIG. 12 or FIG. 13. The extracted data is supplied to the metadata writing module 133.

The first operating system command analysis module 132 is included in the second operating system 131; however it has a function of analyzing the command for the first operating system 111 in order to extract the data for the second operating system 131. Thus, the first operating system command analysis module 132 can process the command of the format which is supplied from the command dispatcher 102 and is treated by the first operating system 111.

These processings such as the obtaining of the command, the extraction and transmission of the data may be repeated several times. If data is transmitted several times, the first operating system command analysis module 132 obtains a command reply from the metadata writing module 133 at step S134. The first operating system command analysis module 132 converts the received command reply into the command reply of a format which can be treated by the first operating system 111 at step S135.

At step S136, the first operating system command analysis module 132 supplies the command reply converted into a command reply for the first operating system 111, to the command dispatcher 102. Corresponding to this processing, the command dispatcher 102 carries out the processing at step S105 (FIG. 8).

As above, the first operating system command analysis module 132 extracts the data for the second operating system 131 from the command of the format which can be treated by the first operating system 111. The first operating system command analysis module 132 also converts the data for the second operating system 131 into the command of the format which can be treated by the first operating system 111. The first operating system command analysis module 132 performs these processings, and thereby the second operating system 131 can process the command of the format which can be treated by the first operating system 111.

Subsequently, a processing by the metadata writing module 133 which receives data supplied from the first operating system command analysis module 132 or which supplies a command reply to the first operating system command analysis module 132 will be described with reference to a flowchart in FIG. 11.

At step S161, the metadata writing module 133 obtains data from the first operating system command analysis module 132. This processing is performed when the first operating system command analysis module 132 performs the processing at step S133 (FIG. 10). At step S162, the metadata writing module 133 writes the obtained data as the second operating system file metadata 134. For example, the data is sequentially written in the second operating system file metadata region 181 (FIG. 13) which has been secured in the memory.

At step S163, it is determined whether or not the writing of the data is completed. The metadata writing module 133 determines the writing of the data is completed when the data is normally written as the second operating system file metadata 134 or when an error occurs for a certain reason. At step S163, the processing returns to step S161 until the writing of the data is determined to be completed, and thus the processing since then is repeated so that the writing of data is continuously performed.

On the other hand, at step S163, if the writing of the data is determined to be completed, the processing at step S164 is performed. At step S164, the metadata writing module 133 generates a command reply for output to the first operating system command analysis module 132. At this time, when the writing is normally completed, a command reply indicating that the writing is normally completed is generated, and when the writing is completed due to occurrence of any errors, a command reply indicating the occurrence of errors is generated.

Figure 10:
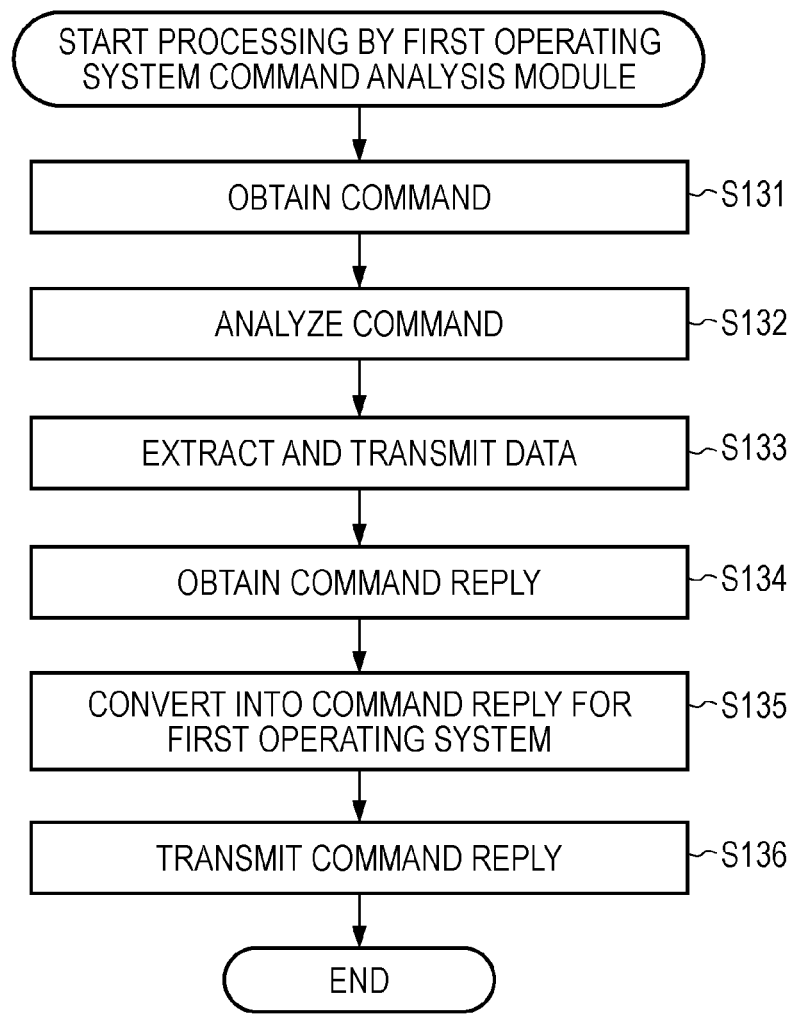
FIG. 10 is a flowchart illustrating a processing by a first operating system command analysis module.

The command reply output from the metadata writing module 133 is received by the first operating system command analysis module 132 as the processing at step S134 (FIG. 10).

In this way, the second operating system file metadata 134 is written, and thereby the IC card 15 lies in a state of beginning the processing in the second operating system 131. As described above, the second operating system file metadata 134 is written, and thereby the second operating system command analysis module 135 or the second file module 136 can work. In addition, the service 137 or the service 138 is registered so as to be available after the registration, and thereby the IC card 15 lies in a state of offering the service.

Figure 12:
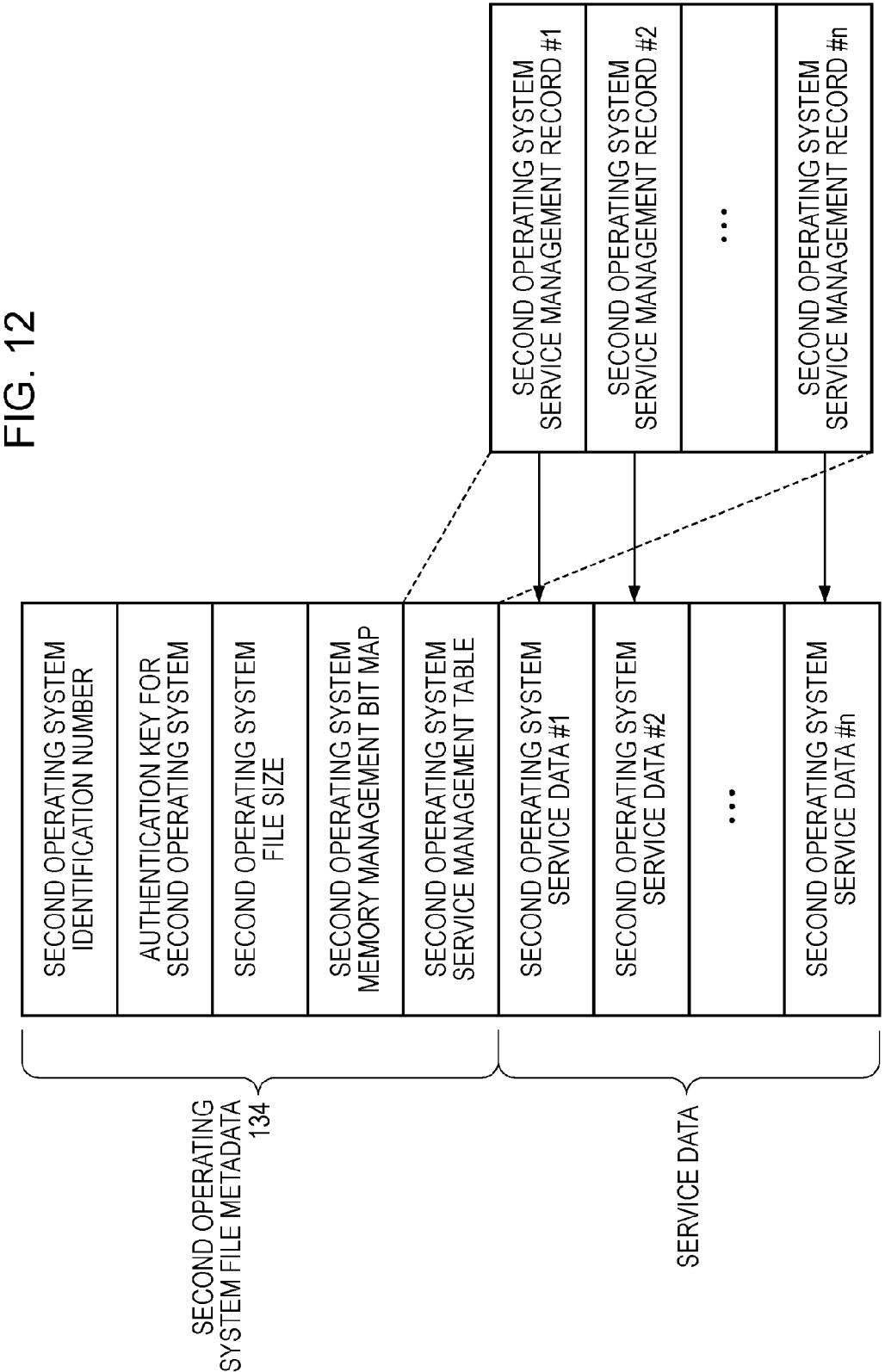
FIG. 12 is a diagram illustrating metadata.

The second operating system file metadata 134 written by this processing will be further described. FIG. 12 is a diagram illustrating a relation between a configuration of the second operating system file metadata 134 and service data of the service 137 (138).

The second operating system file metadata 134 includes a second operating system identification number for identifying the second operating system 131, an authentication key for the second operating system which is used for communicating with other devices via the second communication path 16 (FIG. 6), and a second operating system file size indicating a file size. In addition, the second operating system file metadata 134 includes a second operating system memory management bit map which is address information of data constituting the second operating system file metadata 134, and a second operating system service management table which is a table for managing, for example, the service 137 or the service 138 (FIG. 6), which runs on the second operating system file metadata 134.

The second operating system service management table includes a second operating system service management record #1, a second operating system service management record #2, . . . , and a second operating system service management record #n, which are records for managing the service. These second operating system service management records are as many as the number of services.

Each of the second operating system service management records corresponds to data indicating an address where the service is written. When there is a possibility that a second operating system service data #1, a second operating system service data #2, . . . , and a second operating system service data #n are recorded as service data, the second operating system service management record #1 of the second operating system service management record is data indicating an address where the second operating system service data #1 is written. In addition, the second operating system service management record #2 is data indicating an address where the second operating system service data #2 is written, and the second operating system service management record #n is data indicating an address where the second operating system service data #n is written.

For example, if the second operating system service data #1 is the service 137, the second operating system service management record #1 is data indicating an address where the service 137 is written.

Figure 11:
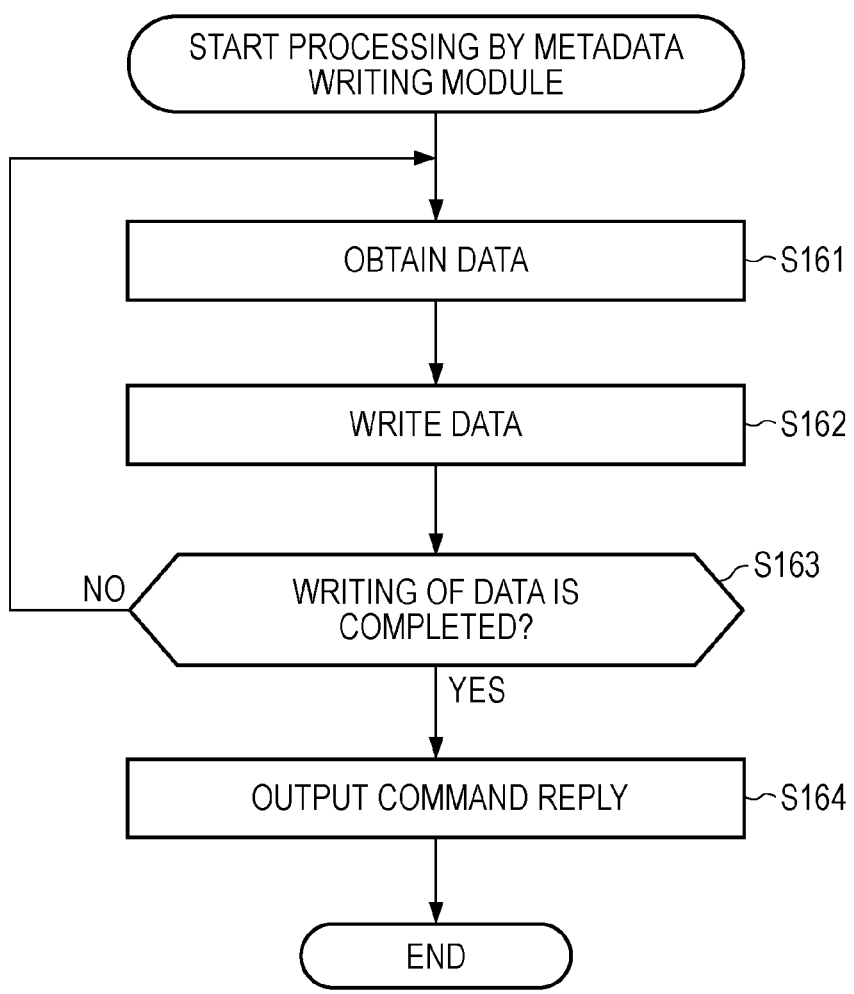
FIG. 11 is a flowchart illustrating a processing by a metadata writing module.

The second operating system identification number, the authentication key for the second operating system, the second operating system file size, the second operating system memory management bit map, and the second operating system service management table, which are included in the second operating system file metadata 134, are written in a region (a second operating system file metadata region 181 shown in FIG. 13) prepared as a region where the second operating system file metadata 134 is written, due to the processings (the processings by the metadata writing module) in the flowchart shown in FIG. 11.

In addition, at step S133 in the flowchart of FIG. 10, the data, which is extracted from the command 161 and is transmitted to the metadata writing module 133 by the first operating system command analysis module 132, corresponds to this data, and the data is written in the second operating system file metadata region 181 by the processing of the metadata writing module 133.

Figure 13:
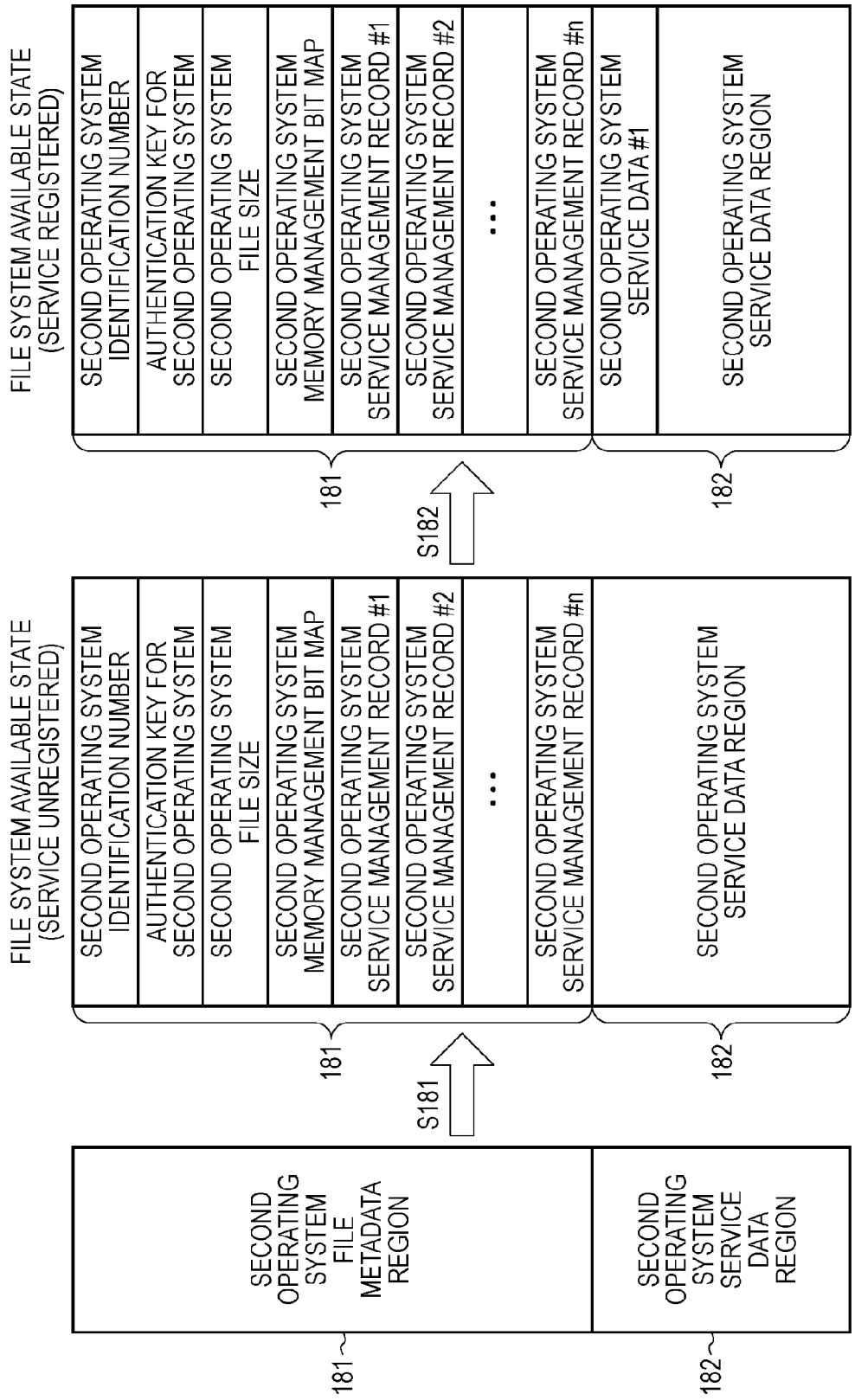
FIG. 13 is a diagram illustrating raising an event.

This will be further described with reference to FIG. 13. The IC card 15 is provided with the second operating system file metadata region 181 where the second operating system file metadata 134 is written and a second operating system service data region 182 where the service 137 or the service 138 is written in advance (they have been secured as reserved regions).

The above-described processing at step S181, that is, the processing is performed by the metadata writing module 133, and when the second operating system file metadata 134 is thus raised, the second operating system file metadata 134 is written in the second operating system file metadata region 181. This second operating system file metadata 134 includes the second operating system identification number, the authentication key for the second operating system, the second operating system file size, the second operating system memory management bit map, and the second operating system service management table, as shown in FIG. 12.

In this way, when the second operating system file metadata 134 is raised to the IC card 15 and the second operating system file metadata 134 is written in the second operating system file metadata region 181, the service data lies in a state capable of being written. In this state, the second operating system service data region 182 is still an unused region.

At step S182, when a service is raised to the IC card 15, the raised service is registered with the IC card 15. For example, when the service 137 is raised and the second operating system service data corresponding to the service 137 is the second operating system service data #1, the second operating system service data #1 is written in the second operating system service data region 182.

This writing may be performed by being supplied to the second operating system 131 via the first communication path 14 and the command dispatcher 102 in the same manner as the writing of the second operating system file metadata 134. Alternatively, the second operating system file metadata 134 has been already written, and the second operating system command analysis module 135 or the second file module 136 has worked, and thus the writing may be performed by being received via the second communication path 16.

When the second operating system service data #1 is written (registered), the second operating system memory management bit map and the second operating system service management table which have been written in the second operating system file metadata region 181 are updated, respectively, in order to correspond to the registered service.

In this way, with respect to the IC card 15 in which the file metadata is not written, the file metadata is written therein, and it is thereby possible to put the IC card 15 in an available state. In addition, as described above, there are some steps in the raising of the event like the event concerning the registration of the service after the metadata is raised. The processing regarding the raising of the metadata can be performed as described above.

In other words, the above example shows the two events such as the raising of the second operating system file metadata 134 and the raising of the service 137. In addition, for example, the raising of the second operating system file metadata 134 may be performed being divided several times, not one time. For example, the event may be performed for each piece of data constituting the second operating system file metadata 134, that is, the second operating system identification number is raised at a first time, and the authentication key for the second operating system is raised at a second time.

Events other than the metadata (e.g., the service) may be also performed as described above. In other words, it is possible to raise any piece of data for the second operating system 131 by use of a command of a format which can be treated by the first operating system 111.

[Another Configuration and Operation of the IC Card]

Figure 14:
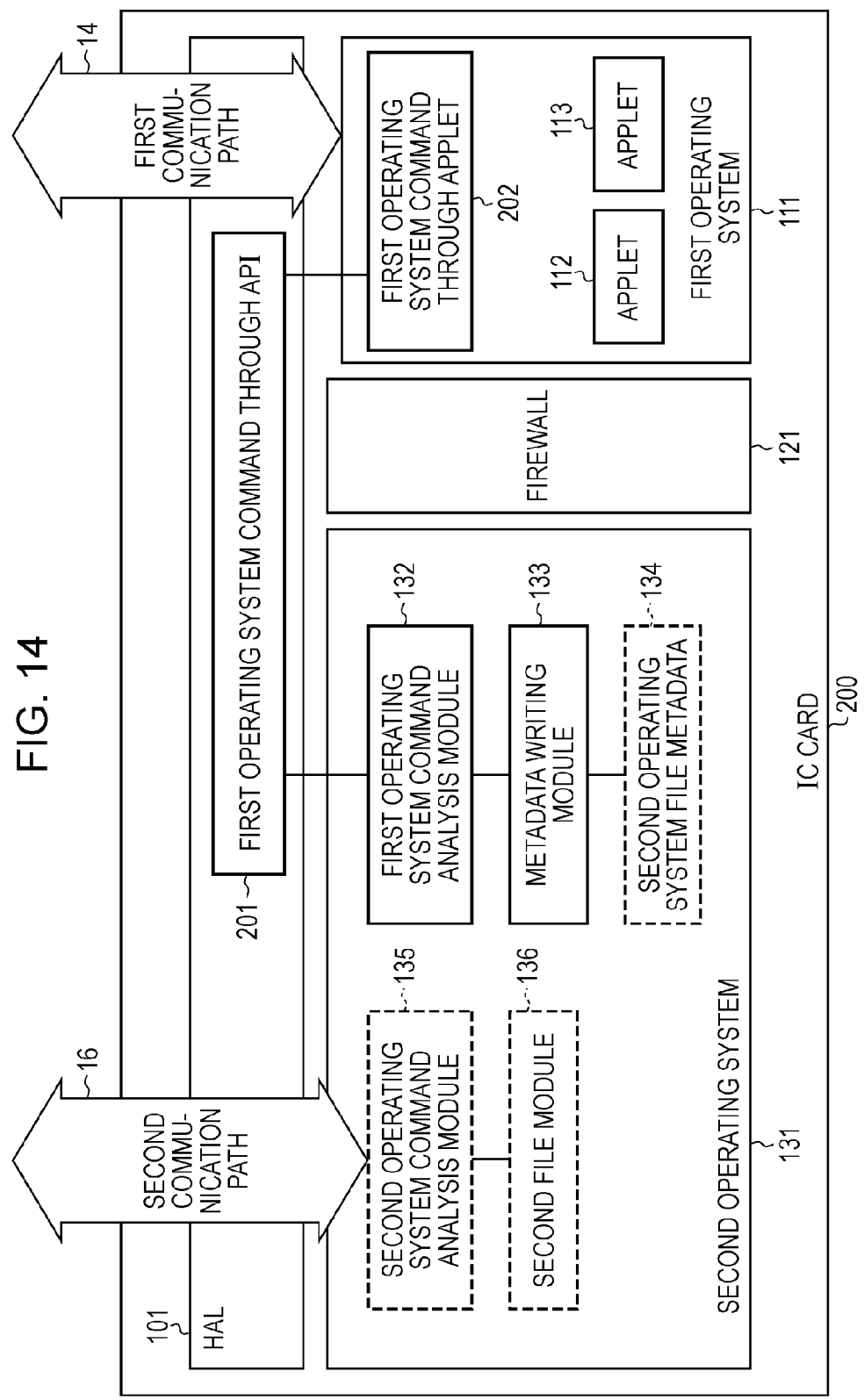
FIG. 14 is a diagram illustrating another configuration of the IC card.

FIG. 14 is a diagram illustrating another configuration of the IC card 15. The IC card 200 shown in FIG. 14 includes an HAL 101, a first operating system command through API (Application Program Interface) 201, a first operating system 111, a first operating system command through applet 202, an applet 112, an applet 113, a firewall 121, a second operating system 131, a first operating system command analysis module 132, a metadata writing module 133, a second operating system file metadata 134, a second operating system command analysis module 135, and a second file module 136.

In the IC card 200 shown in FIG. 14, elements with the same function as those of the IC card 15 shown in FIG. 5 are given the same reference numerals, and the description thereof will be omitted. The IC card 200 shown in FIG. 14 has the first operating system command through API 201 instead of the command dispatcher 102 of the IC card 15 shown in FIG. 5. In addition, the first operating system 111 includes the first operating system command through applet 202.

The first operating system command through API 201 transmits a command, from the first operating system 111 to the second operating system 131, or from the second operating system 131 to the first operating system 111.

The first operating system command through applet 202 transmits a command received via the first communication path 14 to the first operating system command through API 201, or transmits a command from the first operating system command through API 201 to other elements via the first communication path 14. Principally, when receiving a command of the second operating system 131 via the first communication path 14 which communicates under the control based on the first operating system 111, the first operating system command through applet 202 supplies the received command to the first operating system command through API 201.

Figure 15:
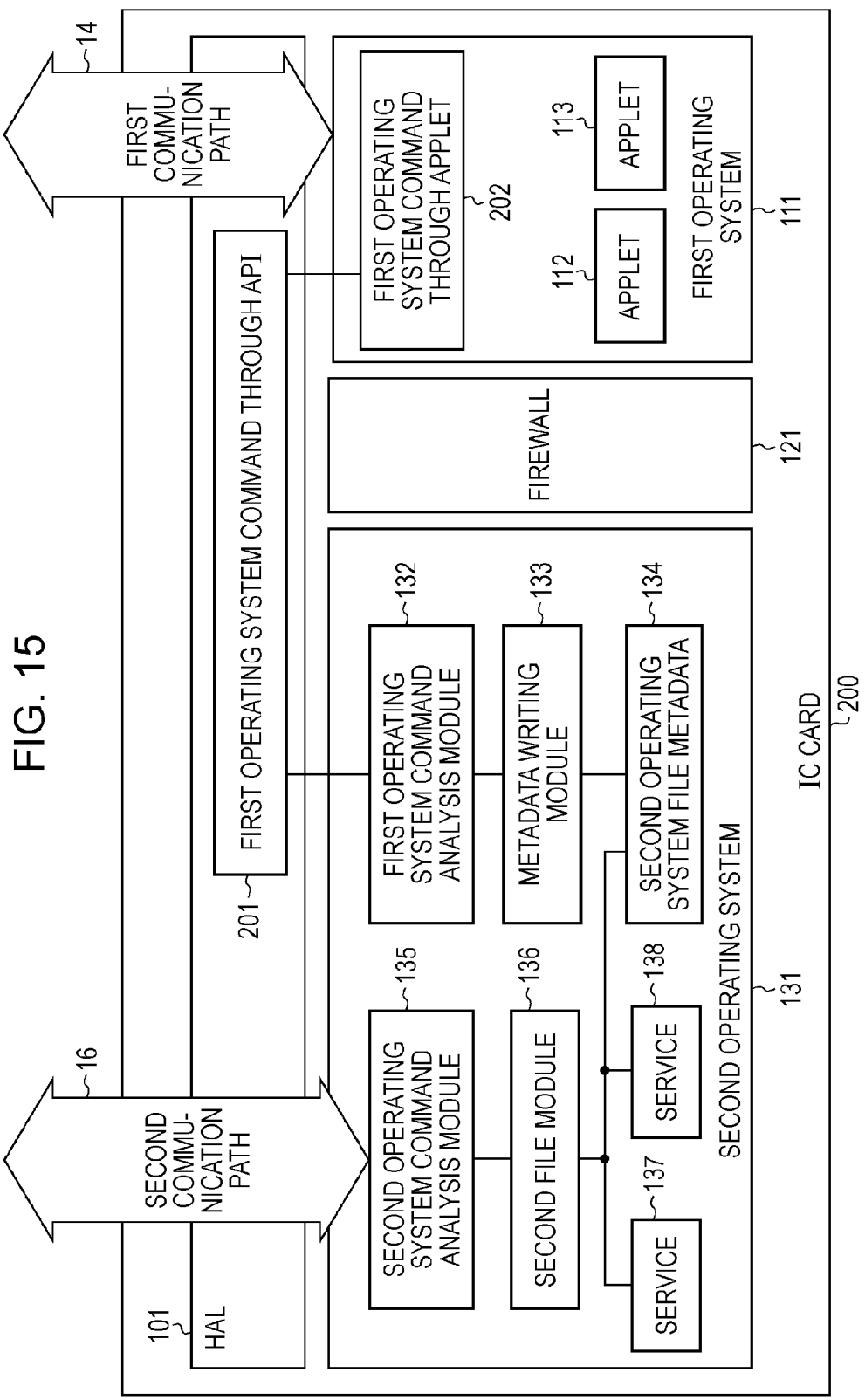
FIG. 15 is a diagram illustrating still another configuration of the IC card.

Also, in the IC card 200 shown in FIG. 14 in the same manner as the IC card 15 shown in FIG. 5, when the second operating system file metadata 134 is written, the second operating system command analysis module 135 or the second file module 136 lies in a state of working. Thereafter, for example, it is possible to add the service 137 or the service 138 to the second operating system 131, as shown in FIG. 15.

Figure 16:
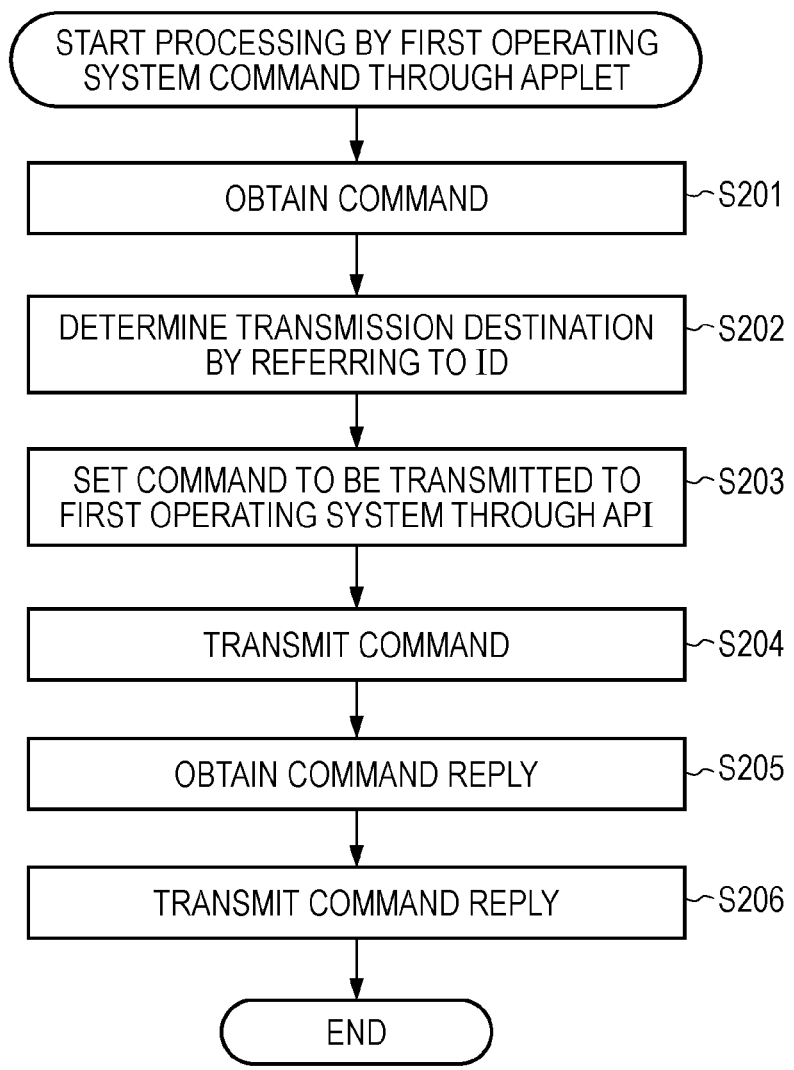
FIG. 16 is a flowchart illustrating a processing by a first operating system command through applet.

Next, a processing by the first operating system command through applet 202 will be described with reference to FIG. 16.

At step S201, the first operating system command through applet 202 receives a command via the first communication path 14. The command received at this time is the command 161 shown in FIG. 9. At step S202, data recorded in a predetermined region in the received command is referred to so as to set a transmission destination. At step S203, the command is set to be transmitted to the first operating system command through API 201. This flow of the processings is made when the data which has been referred to at step S202 indicates a command directed to the second operating system 131.

At step S204, the first operating system command through applet 202 transmits the command 161 received via the first communication path 14 to the first operating system command through API 201. The first operating system command through API 201 transmits the transmitted command 161 to the second operating system 131. The command 161 is received by the first operating system command analysis module 132 of the second operating system 131. Thereafter, data is written as the second operating system file metadata 134 by the second operating system 131. A command reply indicating the writing result is output to the first operating system command through applet 202 via the first operating system command through API 201.

The first operating system command through applet 202 obtains the command reply at step S205. The obtained command reply is converted into a command of a format which can be treated by the first operating system 111 so as to be transmitted via the first communication path 14. Therefore, at step S206, the first operating system command through applet 202 transmits the obtained command reply to the issue server 11 via the first communication path 14.

As above, the first operating system command through applet 202 sets the command from the issue server 11 to be transmitted to the first operating system 111 or first operating system command through API 201 by referring to the information in the command. This setting is performed by the first operating system command through applet 202, and thereby even when the command of a format which is treated by the first operating system 111 is received via the first communication path 14, the command can be transmitted to the first operating system command through API 201. This enables the following processing to be carried out in the first operating system command through API 201 or the second operating system 131.

When the command is transmitted from the first operating system command through applet 202, the first operating system command through API 201 retransmits the transmitted command to the second operating system 131. In addition, when the command is transmitted from the second operating system 131, the first operating system command through API 201 retransmits the transmitted command to the first operating system 111.

The first operating system command analysis module 132 performs a processing based on the flowchart shown in FIG. 10. In other words, the processing is performed in the same manner as one by the first operating system command analysis module 132 of the above-described IC card 15. The description thereof has been already made and thus will be omitted.

The metadata writing module 133 performs a processing based on the flowchart shown in FIG. 11. In other words, the processing is performed in the same manner as one by the metadata writing module 133 of the above-described IC card 15. The description thereof has been already made and thus will be omitted.

In this way, the second operating system file metadata 134 is written, and thereby the IC card 200 lies in a state of beginning the processing in the second operating system 131. As described above, the second operating system file metadata 134 is written, and thereby the second operating system command analysis module 135 or the second file module 136 can work. In addition, the service 137 or the service 138 is registered so as to be available after the registration, and thereby the IC card 200 lies in a state of offering the service.

In this way, with respect to the IC card 200 in which the file metadata is not written, the file metadata is written therein, and it is thereby possible to put the IC card in an available state.

As above, with respect to the IC card 15 or the IC card 200 in which the file metadata is not written, the file metadata is written therein, and it is thereby possible to write the file metadata therein while maintaining security. Thus, a place maintaining security may be not secured in a factory in order to write the file metadata, and thereby it is possible to reduce the cost involved in the place maintaining security.

Although the IC card 15 or the IC card 200 has been exemplified in the above embodiments, an IC chip, an IC card, or a mobile phone is also possible if they have the function of the IC card 15 or the IC card 200.

[Recording Medium]

The series of the processings described above may be executed by hardware or software. When the series of the processings is executed by software, a program constituting the software is installed in a computer. Here, the computer may be a computer including dedicated hardware, or, for example, a general personal computer which can execute various functions by installing various programs.

FIG. 17 is a block diagram illustrating a configuration example of computer hardware which can execute the above-described series of the processings by programs.

In the computer, a CPU (Central Processing Unit) 301, an ROM (Read Only Memory) 302, and an RAM (Random Access Memory) 303 are connected to each other via a bus 304. An input/output interface 305 is further connected to the bus 304. To the input/output interface 305, an input unit 306, an output unit 307, a storage unit 308, a communication unit 309, and a drive 310 are connected.

The input unit 306 includes a keyboard, a mouse, a microphone and so on. The output unit 307 includes a display, a speaker and so on. The storage unit 308 includes a hard disc, non-contact IC card-volatile memory or the like. The communication unit 309 includes a network interface and so on. The drive 310 drives removable medium 311 such as a magnetic disc, an optical disc, a magneto-optical disc, or a semiconductor memory or the like.

In the computer having the configuration described above, the CPU 301 loads, for example, programs stored in the storage unit 308 into the RAM 303 via the input/output interface 305 and the bus 304, for execution, to thereby perform the above-described series of the processings.

The programs executed by the computer (CPU 301) can be offered by being recorded in the removable media 311 as package media or the like. In addition, the programs may be offered via a wire or wireless transmission medium such as a local area network, the Internet, or digital satellite broadcasting.

In the computer, the programs may be installed in the storage unit 308 via the input/output interface 305 by mounting the removable media 311 in the drive 310. In addition, the programs may be received by the communication unit 309 via a wire or wireless transmission medium and then installed in the storage unit 308. The programs may be installed in the ROM 302 or the storage unit 308 in advance.

The program executed by the computer may be a program performing the processings in a time series according to the order described in this specification, or a program performing the processings in parallel or at a timing on being called and the like.

In this specification, the system means the whole apparatus constituted by a plurality of apparatuses.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

This application is claimed as follows:

1. An information processing apparatus comprising:
a processor; and
a memory device storing instructions which when executed by the processor, causes the processor to:
receive a command from an external apparatus via a communication path which communicates under a control based on a first operating system;
determine a transmission destination based on an identifier in the command;
transmit the command to a second operating system when the identifier indicates the transmission destination is the second operating system;
extract data, from the command, the extracted data including an authentication key for the second operating system by analyzing the command;
write the extracted data including the authentication key as data constituting file system metadata of the second operating system in order to work at least one module in the second operating system; and
execute the command using the at least one module in the second operating system.

2. The information processing apparatus according to claim 1, further comprising the first operating system and the second operating system.

3. The information processing apparatus according to claim 1, constituting an IC chip, an IC card, or a mobile phone.

4. The information processing apparatus according to claim 1, wherein an HAL (Hardware Abstract Layer) is used to transmit the command.

5. The information processing apparatus according to claim 1, wherein the at least one module in the second operating system only works after the extracted data is written as data constituting file system metadata of the second operating system.

6. The information processing apparatus according to claim 1, wherein the extracted data as data constituting file system metadata of the second operating system is written in a second operating system file metadata region of the information processing apparatus.

7. The information processing apparatus according to claim 1, wherein the second operating system includes a first operating system command analysis module that extracts the file system metadata of the second operating system from the command, wherein the command has a format which can be treated by the first operating system.

8. An information processing method in an information processing apparatus having a transmission means, an extraction means and a writing means, comprising the steps of:
receiving a command from an external apparatus via a communication path which communicates under a control based on a first operating system, by the transmission means;
determining a transmission destination based on an identifier in the command, by the transmission means;
transmitting the command to a second operating system when the identifier indicates the transmission destination is the second operating system, by the transmission means;
extracting data, from the command, the extracted data including an authentication key for the second operating system by analyzing the transmitted command, by the extraction means;
writing the extracted data including the authentication key as data constituting file system metadata of the second operating system in order to work at least one module in the second operating system, by the writing means; and executing the command using the at least one module in the second operating system.

9. A non-transitory computer readable storage medium storing a computer program for enabling an information processing apparatus having a transmission means, an extraction means and a writing means to:

receive a command from an external apparatus via a communication path which communicates under a control based on a first operating system, by the transmission means;

determine a transmission destination based on an identifier in the command, by the transmission means;

transmit the command to a second operating system when the identifier indicates the transmission destination is the second operating system, by the transmission means;

extract data, from the command, the extracted data including an authentication key for the second operating system by analyzing the transmitted command, by the extraction means;

write the extracted data including the authentication key as data constituting file system metadata of the second operating system in order to work at least one module in the second operating system, by the writing means; and execute the command using the at least one module in the second operating system.

10. An information processing apparatus comprising:

a processor; and a memory device storing instructions which when executed by the processor, causes the processor to:

receive a command from an external apparatus via a communication path which communicates under a control based on a first operating system;

determine a transmission destination based on an identifier in the command;

supply the command to a command through API when the transmission destination is determined to be the second operating system;

transmit the command from the command through API to the second operating system;

extract data, from the command, the extracted data including an authentication key for the second operating system by analyzing the command;

write the data including the authentication key extracted by the extraction means as data constituting file system metadata of the second operating system in order to work at least one module in the second operating system; and execute the command using the at least one module in the second operating system.

11. The information processing apparatus according to claim 10, constituting an IC chip, an IC card, or a mobile phone.

12. The information processing apparatus according to claim 10, wherein the command is supplied to the command through API from the first operating system.

13. The information processing apparatus according to claim 10, wherein the command through API is provided in an HAL (Hardware Abstract Layer).

14. An information processing method in an information processing apparatus having a supply means, a transmission means, an extraction means and a writing means, comprising the steps of:

receiving a command from an external apparatus via a communication path which communicates under a control based on a first operating system, by the supply means;

determining a transmission destination based on an identifier in the command, by the supply means;

supplying the command to the transmission means when the transmission destination is determined to be a second operating system, by the supply means;

transmitting the supplied command to the second operating system, by the transmission means;

extracting data, from the command, the extracted data including an authentication key for the second operating system by analyzing the transmitted command by the extraction means;

writing the extracted data including the authentication key as data constituting file system metadata of the second operating system in order to work at least one module in the second operating system, by the writing means; and executing the command using the at least one module in the second operating system.

15. A non-transitory computer readable storage medium storing a computer program for enabling an information processing apparatus having a supply means, a transmission means, an extraction means and a writing means to:

receive a command from an external apparatus via a communication path which communicates under a control based on a first operating system, by the supply means;

determine a transmission destination based on an identifier in the command, by the supply means;

supply the command to the transmission means when the transmission destination is determined to be a second operating system, by the supply means;

transmit the supplied command to the second operating system, by the transmission means;

extract data, from the command, the extracted data including an authentication key for the second operating system by analyzing the transmitted command by the extraction means;

write the extracted data including the authentication key as data constituting file system metadata of the second operating system in order to work at least one module in the second operating system, by the writing means; and execute the command using the at least one module in the second operating system.

16. An information processing apparatus comprising:

a transmission unit configured to receive a command from an external apparatus via a communication path which communicates under a control based on a first operating system, determine a transmission destination based on an identifier in the command, and transmit the command to a second operating system when the identifier indicates the transmission destination is the second operating system;

an extraction unit configured to extract data, from the command, the extracted data including an authentication key for the second operating system by analyzing the command transmitted from the transmission unit; and a writing unit configured to write the data, including the authentication key extracted by the extraction unit as data constituting file system metadata of the second operating system in order to work at least one module in the second operating system, wherein the command is executed using the at least one module in the second operating system.

17. An information processing apparatus comprising:
- a supply unit configured to receive a command from an external apparatus via a communication path which communicates under a control based on a first operating system, determine a transmission destination based on an identifier in the command, and supply the command to a transmission means when the transmission destination is determined to be a second operating system;
- a transmission unit configured to transmit the command supplied from the supply unit to the second operating system;
- an extraction unit configured to extract data, from the command, the extracted data including an authentication key for the second operating system by analyzing the command transmitted from the transmission unit; and
- a writing unit configured to write the data including the authentication key extracted by the extraction unit as data constituting file system metadata of the second operating system in order to work at least one module in the second operating system, wherein the command is executed using the at least one module in the second operating system.

\* \* \* \* \*